(12) United States Patent
Sugita et al.

(10) Patent No.: US 7,771,612 B2
(45) Date of Patent: Aug. 10, 2010

(54) HYDROGEN GENERATING COMPOSITION

(75) Inventors: Taiichi Sugita, Ibaraki (JP); Masaya Yano, Ibaraki (JP); Masakazu Sugimoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 506 days.

(21) Appl. No.: 11/661,230

(22) PCT Filed: Aug. 26, 2005

(86) PCT No.: PCT/JP2005/016061

§ 371 (c)(1),
(2), (4) Date: Jan. 22, 2008

(87) PCT Pub. No.: WO2006/025511

PCT Pub. Date: Mar. 9, 2006

(65) Prior Publication Data
US 2008/0251753 A1    Oct. 16, 2008

(30) Foreign Application Priority Data

Aug. 30, 2004 (JP) ............... 2004-249944
Jun. 2, 2005 (JP) ............... 2005-162323

(51) Int. Cl.
*C01B 3/08* (2006.01)
*C01B 3/10* (2006.01)

(52) U.S. Cl. ............... 252/188.25; 252/181.2; 252/181.6; 252/181.7; 423/657; 429/207; 429/218.1; 429/218.2; 429/232

(58) Field of Classification Search ............ 252/188.25, 252/181.6, 181.7; 423/657; 429/207, 218.1
See application file for complete search history.

(56) References Cited

U.S. PATENT DOCUMENTS

| 6,582,676 | B2 * | 6/2003 | Chaklader ............... 423/648.1 |
| 2002/0037452 | A1 | 3/2002 | Schmidt |
| 2002/0048548 | A1 | 4/2002 | Chaklader |
| 2007/0020174 | A1 * | 1/2007 | Xu et al. ............... 423/657 |
| 2007/0237994 | A1 * | 10/2007 | Nakai et al. ............... 429/19 |
| 2008/0090116 | A1 * | 4/2008 | Nakai et al. ............... 429/19 |
| 2008/0128655 | A1 * | 6/2008 | Garg et al. ............... 252/373 |
| 2008/0152584 | A1 * | 6/2008 | Anand ............... 423/657 |

(Continued)

FOREIGN PATENT DOCUMENTS

JP    2001-525449    12/2001

(Continued)

OTHER PUBLICATIONS

International Search Report issued on the corresponding International Application No. PCT/JP2005/016061, dated Nov. 14, 2005.

*Primary Examiner*—Joseph D Anthony
(74) *Attorney, Agent, or Firm*—Knobbe Martens Olson & Bear LLP

(57) ABSTRACT

In contrast, the alkaline compound included in the composition of the Document D1 is strong alkali, such as sodium hydroxide. Therefore, the oxide of an alkaline earth metal used in the amended invention is not disclosed or suggested in the D1 at all.

In addition, the composition of D1 is an oxygen scavenger and it includes compound which enhance the reaction of oxygen with hydrogen, such as catalyst. Therefore, its hydrogen generating ability is lower than that of the claimed invention.

15 Claims, 2 Drawing Sheets

U.S. PATENT DOCUMENTS

| | | | |
|---|---|---|---|
| 2008/0260632 A1* | 10/2008 | Anand | 423/657 |
| 2009/0167239 A1* | 7/2009 | Yano et al. | 320/101 |
| 2009/0252671 A1* | 10/2009 | Fullerton | 423/657 |
| 2009/0267023 A1* | 10/2009 | Miki et al. | 252/182.35 |
| 2010/0028216 A1* | 2/2010 | Park | 422/105 |

FOREIGN PATENT DOCUMENTS

| | | |
|---|---|---|
| JP | 2004-231466 A | 8/2004 |
| WO | WO 99/28411 A | 6/1999 |
| WO | WO 2004/052775 A | 6/2004 |

* cited by examiner

HYDROGEN GENERATING COMPOSITION

This application is the U.S. National Phase under 35 U.S.C. §371 of International Application No. PCT/JP2005/016061, filed Aug. 26, 2005, which claims priority to Japanese Patent Applications No. 2004-249944, filed Aug. 30, 2004 and No. 2005-162323, filed Jun. 2, 2005.

TECHNICAL FIELD

The present invention relates to a hydrogen generating composition which generates a hydrogen gas effectively by supplying water (including water vapor) to aluminum, and is useful, particularly, in a hydrogen generating apparatus for supplying hydrogen to a fuel cell.

BACKGROUND ART

Conventionally, as a method of generating a hydrogen gas by a reaction of water and aluminum, a method of reacting water and aluminum while a new surface of aluminum is produced by cutting it in water has been known (for example, see Japanese Patent Application Laid-Open No. 2001-31401).

However, according to this method, since new surfaces and fine particles of aluminum are successively produced, it was difficult to control a rate of reacting water and aluminum. In addition, unless heating is performed from the outside, a reaction rate becomes insufficient, and there is also a problem of heating controlling.

In addition, a method of supplying water to a powder in which an aluminum powder and a metal powder having smaller ionization tendency are mixed so as to react water and aluminum has been known (for example, see Japanese Patent Application Laid-Open No. 2002-104801). In this method, by mixing the metal powder having smaller ionization tendency than that of aluminum, an apparent rate of reacting water and aluminum can be enhanced.

Further, as a hydrogen generating composition which can stably produce hydrogen at a normal temperature, a hydrogen generating composition containing an aluminum powder and a calcium oxide powder in which a ratio of the aluminum powder is 85% by weight or less per 100% by weight of the sum of the aluminum powder and the calcium oxide powder, has been known (for example, Japanese Patent Application Laid-Open No. 2004-231466). And, as an aluminum powder, the powder having a particle size distribution of 50 to 150 μm is preferably used.

However, in this hydrogen generating composition, since a content of calcium oxide is large, calcium oxide is converted into calcium hydroxide by a reaction with water, an amount of a produced calcium ion is increased, therefore, it is hardly said that this is a suitable method as a method of generating a hydrogen gas to be supplied to a fuel cell. That is, it was found out that when an amount of a produced calcium ion is increased, a large amount of the ion is contained in water contained in a produced hydrogen gas, the calcium ion together with a hydrogen gas reaches a solid electrolyte of a fuel cell, and causes a problem of suppression of proton conducting function.

On the other hand, in a hydrogen generating composition containing aluminum as a main component, it was found out that, when aluminum oxide is produced by progression of a reaction, aggregation and solidification of reaction products are easily caused, aluminum particles are shut therein, and a reaction yield is lowered. And, such the aggregation and solidification phenomenon becomes remarkable as a particle diameter of aluminum particles is smaller.

DISCLOSURE OF THE INVENTION

An object of the present invention is to provide a hydrogen generating composition which can generate a hydrogen gas effectively and at a high reaction rate at around room temperature, particularly, the produced hydrogen gas hardly suppressing proton conducting function of a solid electrolyte.

In order to attain the aforementioned object, the present inventors intensively studied, and found out that, by reducing a particle diameter of aluminum particles, and adding aggregation suppressing particles, a sufficient reaction yield can be attained even when an amount of calcium oxide is reduced, and a concentration of a calcium ion contained in a hydrogen gas can be reduced, which resulted in completion of the present invention.

That is, the hydrogen generating composition of the present invention comprises aluminum particles having an average particle diameter of 40 μm or less, 0.1 to 10 parts by weight of an alkaline inorganic compound, and 0.1 to 30 parts by weight of aggregation suppressing particles, the each part being relative to 100 parts by weight of the aluminum particles.

According to the hydrogen generating composition of the present invention, since the aluminum particles have an average particle diameter of 40 μm or less, and 0.1 to 30 parts by weight of aggregation suppressing particles are contained, a sufficient reaction rate can be attained even when an amount of calcium oxide is 0.1 to 10 parts by weight and a concentration of a calcium ion contained in a produced hydrogen gas can be lowered. In addition, by addition of the aggregation suppressing particles, aggregation and solidification of the aluminum particles and aluminum oxide can be suppressed, and a higher reaction yield can be attained. As a result, the hydrogen generating composition which can generate efficiently a hydrogen gas at around room temperature at a high reaction yield, the generated hydrogen gas hardly suppressing proton conducting function of a solid electrolyte, can be provided.

In the forgoing, in order to improve both of a reaction rate and a reaction yield of hydrogen generation, it is particularly preferable that the alkaline inorganic compound is calcium oxide, and the aggregation suppressing particles is carbon black.

It is preferable that the hydrogen generating composition of the present invention is a tablet in which a particle mixture is densified, in order to enhance a hydrogen generation amount per unit volume while a reaction rate and a reaction yield of hydrogen generation are sufficiently maintained.

In the present invention, in order to maintain a reaction rate and a reaction yield of hydrogen generation, it is particularly preferable that a density is 0.4 to 11.0 g/cm$^3$.

BEST MODE FOR CARRYING OUT THE INVENTION

Figure 1:
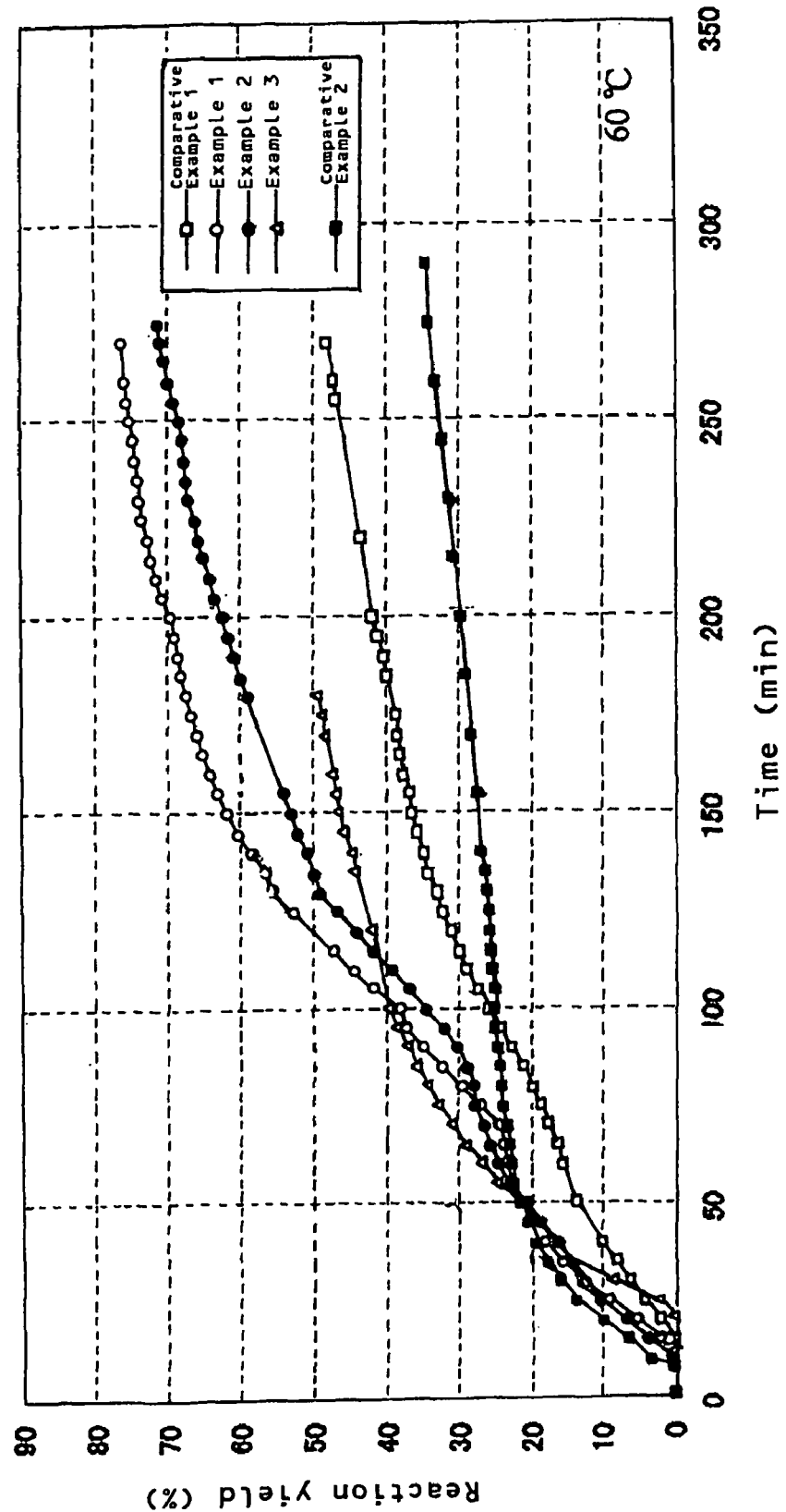
FIG. 1 is a graph showing changes in a reaction yield with time obtained from an amount of a generated hydrogen gas in Examples and Comparative Examples.

The hydrogen generating composition of the present invention contains 0.1 to 10 parts by weight of an alkaline inorganic compound, and 0.1 to 30 parts by weight of aggregation suppressing particles relative to 100 parts by weight of aluminum particles of an average particle diameter of 40 μm or less.

Aluminum particles have an average particle diameter of 40 μm or less, preferably 1 to 15 μm. When an average diameter is smaller than 1 μm, there is a tendency that manufacturing becomes difficult, secondary aggregation occurs, reduction in a surface area is remarkable by sintering upon temperature raising, and therefore hydrogen generation is reduced. When an average particle diameter exceeds 40 μm, a reaction yield becomes insufficient unless a content of calcium oxide is increased.

It is preferable that aluminum particles are prepared by an atomizing method. In addition, it is preferable that an oxidized surface later is removed. As such aluminum particles, various commercially available aluminum particles can be used.

A content of aluminum particles is preferably 50 to 99.5% by weight, more preferably 70 to 90% by weight in a hydrogen generating composition. When a content of aluminum particles is less than 50% by weight, there is a tendency that a total generation amount of a hydrogen gas becomes insufficient.

Examples of an alkaline inorganic compound include oxide, hydroxide and carbonate of an alkali metal or an alkaline earth metal, and an alkaline inorganic compound is preferably one or more kinds selected from the group consisting of calcium oxide, sodium hydroxide, potassium hydroxide, calcium hydroxide, borax, sodium carbonate, and calcium carbonate.

An alkaline inorganic compound can be added as particles, or by a method of making the compound carried in other particles. When alkaline inorganic compound particles are used, an average particle diameter thereof is preferably 1 to 50 μm. When an average particle diameter of alkaline inorganic compound particles is less than 1 μm, there is a tendency that a hydrogen generation time is delayed. When the average particle diameter exceeds 50 μm, there is a tendency that particles are vigorously reacted with water to produce the heat, and a large amount of water is used.

In addition, examples of a method of making an alkaline inorganic compound carried in other particles include a method of mixing the other particles such as carbon black or aluminum oxide in a dispersion or an solution of an alkaline inorganic compound and, thereafter, drying this, thereby, making the compound carried in other particles.

A content of an alkaline inorganic compound is 0.1 to 10 parts by weight, preferably 1 to 5 parts by weight, more preferably 1 to 1.5 parts by weight relative to 100 parts by weight of aluminum particles. When a content of an alkaline inorganic compound is less than 0.1 part by weight, a reaction rate and a reaction yield cannot be improved. On the other hand, when the content exceeds 10 parts by weight, a large amount of calcium ion is contained in a produced hydrogen gas, thereby, proton conducting function of a solid electrolyte is suppressed.

As aggregation suppressing particles, fine particles which are inert to a hydrogen generation reaction can be used, and it is preferable that aggregation suppressing particles is one or more kinds selected from the group consisting of carbon black, silica, cerium oxide, aluminum oxide, and titanium oxide. Among them, carbon black is particularly preferable in order to enhance aggregation suppressing effect.

In the present invention, aggregation suppressing particles are contained at 0.1 to 30 parts by weight, preferably 10 to 25 parts by weight relative to 100 parts by weight of the aluminum particles. When a content of aggregation suppressing particles is less than 0.1 part by weight, there is a tendency that the effect of suppressing aggregation adhesion of aluminum particles is reduced. And it becomes difficult to attain a high reaction yield. When the content exceeds 30 parts by weight, a content of aluminum particles is reduced relatively, and there is a tendency that a total generation amount of a hydrogen gas is insufficient.

As carbon black, any carbon black such as channel black, thermal black, acetylene black, kechen black, and furnace black can be used. In such carbon black, there is hydrophilized carbon black, but in order to enhance aggregation suppressing effect, untreated hydrophobic carbon black is preferably used in the present invention. Alternatively, these are used to make calcium oxide to be carried. An average primary particle diameter of carbon black is preferably 0.01 to 0.5 μm.

In the present invention, active carbon or zeolite may be further added. Examples of active carbon include coconut shell carbon, charcoal, and peat carbon, and active carbon acts also as a water retention agent. It is preferable that active carbon has iodide adsorbing performance of 800 to 1200 mg/g.

In addition, an inorganic electrolyte may be added. As an inorganic electrolyte, chloride of an alkali metal, an alkaline earth metal, and a heavy metal, and sulfate of an alkali metal are preferable and, for example, sodium chloride, potassium chloride, calcium chloride, magnesium chloride, ferric chloride, and sodium sulfate are used.

The hydrogen generating composition of the present invention may be a powdery mixture, or may be densified mixture such as a pellet and a tablet obtained by densifying by pressing. By performing such the densification, a hydrogen generation amount per unit volume can be increased.

In the present invention, in order to maintain a reaction rate and a reaction yield of hydrogen generation, a density is preferably 0.4 to 1.5 g/cm$^3$, and it is more preferably that a density is 0.7 to 1.1 g/cm$^3$.

The pressing can be performed by pressing a powdery mixture until such the density is obtained. In order to avoid deformation of a material and blocking of a material due to excessive densification of mixed particles, it is preferable to perform the pressing at a pressure of 3 to 50 MPa.

In the present invention, as shown in the following equation A, for example, calcium oxide is reacted with water to produce calcium hydroxide.

$$CaO + H_2O \rightarrow Ca(OH)_2 \quad (A)$$

Produced calcium hydroxide is reacted with aluminum to produce calcium aluminate and hydrogen, and a representative reaction is the following equation B.

$$3Ca(OH)_2 + 2Al \rightarrow 3CaO.Al_2O_3 + 3H_2 \quad (B)$$

As calcium aluminate, in addition to a compound of $3CaO.Al_2O_3$ in the equation B, compounds of $CaO.2Al_2O_3$, $CaO.Al_2O_3$, $Ca_3[Al(OH)_6]_2$, and $2Ca(OH)_2.Al(OH)_2.5/2H_2O$ are known.

On the other hand, a hydrogen generation method using the hydrogen generating composition of the present invention generates a hydrogen gas by supplying water to the hydrogen generating composition of the present invention. Water can be supplied as a liquid or a gas (water vapor). Specifically, for example, when a hydrogen gas is supplied to a fuel cell of portable electronic equipments, a hydrogen generating composition is filled in a sealed container (a hydrogen generating composition may be held by an absorbent cotton or a nonwoven fabric), and a hydrogen gas may be supplied to a fuel cell via a tube connected to a sealed container while water is supplied with a syringe pump or a micropump. Thereupon, if necessary, a sealed container may be heated.

In view of balance between heating energy and a reaction rate, a reaction temperature upon hydrogen generation is preferably 30 to 90° C., more preferably 35 to 50° C. And, when a hydrogen gas is generated at a stable generation amount, it is preferable to supply water at a supplying rate of 1.0 to 3.0 ml/h per g of an aluminum powder.

Since the hydrogen generating method of the present invention can generate a hydrogen gas at around room temperature, efficiently, and at a high reaction yield, and a produced hydrogen gas hardly suppresses proton conducting function of a solid electrolyte, the method is preferably used in utility of supplying a generated hydrogen gas to a fuel cell.

EXAMPLES

Examples specifically showing the feature and the effect of the present invention will be explained below. Assessment item in Examples was measured as follows:

(1) Hydrogen Generation Amount

After a generated hydrogen gas is dried via a silica gel dryer, an instant hydrogen generation flow rate and a hydrogen generation total amount were measured with a mass flowmeter (manufactured by KOT-LOC).

Example 1

One gram of an aluminum powder (manufactured by Kojundo Chemical Laboratory Co., Ltd.: average particle diameter 3 μm), 0.23 g of carbon black (manufactured by Cabot Corporation: Vulcan XC-72R, average particle diameter 20 nm), and 0.015 g of calcium oxide (Wako Pure Chemical Industries, Ltd., A-12112, powder reagent) were placed into a 20 cc beaker and mixed, and the mixture was placed in a vessel in hot water, and retained at a temperature of 60° C. While water was supplied with a microsyringe pump at a supplying rate of 1.0 ml/h (a total supply amount water was 3.0 ml), a generated gas was taken out through a tube. Thereupon, a generation amount was measured with a mass flowmeter while hydrogen was collected by a water displacing method. A change with time in a reaction yield obtained from a hydrogen generation amount thereupon is shown in FIG. 1. A reaction yield when 150 minutes had passed from initiation of water supply was 62%. Like this, by using carbon black jointly, a higher reaction yield than that of other Examples was exhibited.

Example 2

One gram of an aluminum powder (manufactured by Kojundo Chemical Laboratory Co., Ltd.: average particle diameter 3 μm), 0.23 g of carbon black (manufactured by Cabot Corporation: Vulcan XC-72R, average particle diameter 20 nm), 0.015 g of calcium oxide (Wako Pure Chemical Industries, Ltd., A-12112, powder reagent), and 0.05 g of potassium chloride were placed into a 20 cc beaker and mixed, and the mixture was placed in a vessel in hot water, and retained at a temperature of 60° C. While water was supplied with a microsyringe pump at a supply rate of 1.0 ml/h (a total supply amount of water was 3.0 ml), a generated gas was taken out through a tube. Thereupon, a generation amount was measured with a mass flowmeter while hydrogen was collected by a water replacing method. A change with time in a reaction yield obtained from a hydrogen generation amount thereupon is shown in FIG. 1. A reaction yield when 150 minutes had passed from initiation of water supply was 52%. Like this, by using carbon black jointly, a higher reaction yield other than that of other Examples was exhibited.

Example 3

One gram of an aluminum powder (manufactured by Kojundo Chemical Laboratory Co., Ltd.: average particle diameter 3 μm), and 0.015 g of calcium oxide (Wako Pure Chemical Industries, Ltd., A-12112, powder reagent) were placed into a 20 cc beaker and mixed, and the mixture was placed into a vessel in hot water, and was retained at 60° C. While water was supplied with a microsyringe pump at a supply rate of 1.0 ml/h (a total supply amount of water was 3.0 ml), a generated gas was taken out through a tube. Thereupon, a generation amount was measured with a mass flowmeter while hydrogen was collected by a water replacing method. A change with time in a reaction yield obtained from a hydrogen generation amount thereupon is shown in FIG. 1. A reaction yield when 150 minutes had passed from initiation of water supply was 48%.

Comparative Example 1

One gram of an aluminum powder (manufactured by Kojundo Chemical Laboratory Co., Ltd.: average particle diameter 3 μm), and 0.23 g of carbon black (manufactured by Cabot Corporation: Vulcan XC-72R, average particle diameter 20 nm) were placed into a 20 cc beaker and mixed, and the mixture was placed in a vessel in hot water, and retained at a temperature of 60° C. While water was supplied with a microsyringe pump at a supply rate of 1.0 ml/h (a total supply amount of water was 3.0 ml), a generated gas was taken out through a tube. A generation amount was measured with a mass flowmeter while hydrogen was collected by a water replacing method. A change with time in a reaction yield obtained from a hydrogen generation amount thereupon is shown in FIG. 1. A reaction yield when 150 minutes had passed from initiation of water supply was 37%.

Comparative Example 2

One gram of an aluminum powder (manufactured by Kojundo Chemical Laboratory Co., Ltd.: average particle diameter 3 μm) was placed into a 20 cc beaker, mixed, and placed into a vessel in hot water, and retained at a temperature of 60° C. While water was supplied with a microsyringe pump at a supply rate of 1.0 ml/h (a total supply amount of water was 3.0 ml), a generated gas was taken out though a tube. Thereupon, a generation amount was measured with a mass flowmeter while hydrogen was collected by a water replacing method. A changed with time in a reaction yield obtained from a hydrogen generation amount thereupon is shown in FIG. 1. A reaction yield when 150 minutes had passed from initiation of water supply was 28%.

Example 4

Carbon black (manufactured by Cabot Corporation: Vulcan XC-72R, average particle diameter 20 nm) 0.23 g, calcium oxide (Wako Pure Chemical Industries, Ltd., A-12112, powder reagent) 0.015 g and 1 cc of water were placed into a 20 cc beaker and mixed, and the mixture was placed into a dryer at 60° C., and allowed to stand for 6 hours to dry it, thereby to prepare carbon black carrying calcium oxide. Its total amount (0.245 g) and 1 g of an aluminum powder (manufactured by Kojundo Chemical Laboratory Co., Ltd.: average particle diameter 3 μm) were placed into a 20 cc beaker and mixed, and the mixture was placed into a vessel in hot water, and retained at a temperature of 60° C. While water was supplied with a microsyringe pump at a supply rate of 1.0 ml/h (a total supply amount of water was 3.0 ml), a generated gas was taken out through a tube. Thereupon, a generation amount was measured with a mass flowmeter while hydrogen was collected by a water replacing method. A change with time in a reaction yield obtained from a hydrogen generation amount thereupon was approximately the same as that of Example 1, and a reaction yield when 150 minutes had passed from initiation of water supply was 60%.

Example 5

Figure 2:
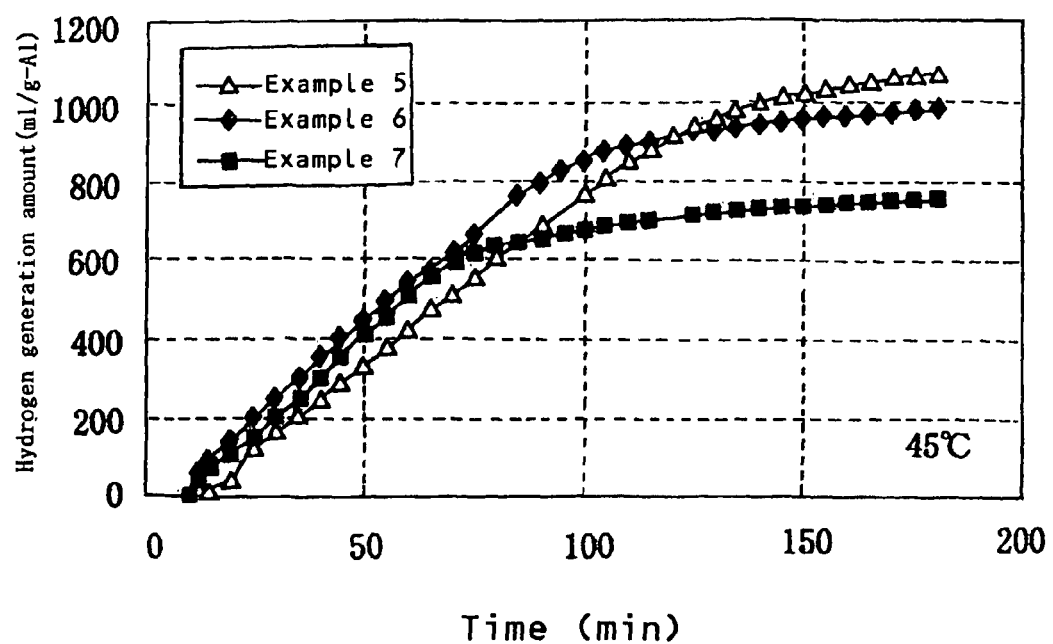
FIG. 2 is a graph showing changes in an amount of a generated hydrogen gas with time in Examples 5 to 7.

One gram of an aluminum powder (manufactured by Kojundo Chemical Laboratory Co., Ltd.: average particle diameter 3 μm), 0.23 g of carbon black (manufactured by Cabot Corporation: Vulcan XC-72R, average particle diameter 20 nm), and 0.015 g of calcium oxide (Wako Pure Chemical Industries, Ltd., A-12112, powder reagent) were placed into a 20 cc beaker, and mixed, and the mixture was placed into a vessel in hot water, and was retained at a temperature of 45° C. While water was supplied with a microsyringe pump at a supply rate of 1.0 ml/h (a total supply amount of water was 3 ml), a generated gas was taken out through a tube. Thereupon, a generation amount was measured with a mass flowmeter while hydrogen was collected by a water replacing method. A change with time in a hydrogen generation amount thereupon is shown in FIG. 2. A density of a mixed powdery hydrogen generating composition was 0.24 g/ml.

Example 6

According to the same manner as that of Example 5 except that the powdery hydrogen generating composition obtained in Example 5 was formulated into a tablet having a density of 0.48 g/ml by pressing, a hydrogen generating composition was prepared, and a hydrogen generation amount was measured. A change with time in a hydrogen generation amount thereupon is shown in FIG. 2. As a result, as shown in FIG. 2, even when a volume was densified to a half, a hydrogen generation amount was almost the same as compared with a powdery generating composition.

Example 7

According to the same manner as that of Example 5 except that the powdery hydrogen generating composition obtained in Example 5 was formulated into a tablet having a density of 0.97 g/ml by pressing, a hydrogen generating composition was prepared, and a hydrogen generation amount was measured. A change with time in a hydrogen generation amount thereupon is shown in FIG. 2. As a result, as shown in FIG. 2, even when a volume was densified to ¼, a hydrogen generation amount was approximately the same as that of the powdery generating composition until 100 minutes passed.

Reference Example

As in Example 1, a powdery hydrogen generating composition was prepared from 1 g of an aluminum powder, 0.18 g of carbon black, and 0.015 g of calcium oxide, and 10 ml of water was added to a beaker to react them. After completion of the reaction, remaining water was diluted 1000-fold, a calcium concentration was measured by induction-coupled plasma-mass spectroscopy (ICP-MS), and it was fount to be 12,500 ng/ml as expressed by a concentration before dilution.

In addition, water before dilution was distilled at 60° C., a concentration of calcium in water contained in a fraction was measured by the same apparatus and it was found to be 17.6 ng/ml. Like this, it was found that, at a temperature and a remaining water calcium concentration near the condition at an actual reaction, a concentration of calcium contained in a generated water steam is suppressed low.

To the contrary, in the case where a powdery hydrogen generating composition was prepared from 1 g of an aluminum powder and 0.20 g of calcium oxide, when a reaction was initiated by addition of water, a mist was flown, and calcium oxide was flown to such an extent that a wall surface of a beaker became white.

The invention claimed is:

1. A hydrogen generating composition comprising aluminum particles having an average particle diameter of 40 μM or less, 0.1 to 10 parts by weight of oxide of an alkaline earth metal, and 0.1 to 30 parts by weight of aggregation suppressing particles, the each part being relative to 100 parts by weight of the aluminum particles.

2. The hydrogen generating composition according to claim 1, wherein the alkaline earth metal is calcium oxide.

3. The hydrogen generating composition according to claim 1, wherein the aggregation suppressing particles is one or more compounds selected from the group consisting of carbon black, silica, cerium oxide, aluminum oxide, and titanium oxide.

4. The hydrogen generating composition according to claim 1, wherein the alkaline earth metal is calcium oxide, and the aggregation suppressing particles are carbon black.

5. The hydrogen generating composition according to claim 1, wherein a mixture of the particles forms a densified tablet.

6. The hydrogen generating composition according to claim 5, whose density is 0.4 to 1.5 g/cm$^3$.

7. The hydrogen generating composition according to claim 1, wherein said aluminum particles have an average particle diameter of 1 to 15 μm.

8. The hydrogen generating composition according to claim 1, wherein said oxide of an alkaline earth metal has an average particle diameter of 1 to 50 μM.

9. The hydrogen generating composition according to claim 1, wherein said aggregation suppressing particles comprise untreated hydrophobic carbon black.

10. The hydrogen generating composition according to claim 1, further comprising active carbon having iodide adsorbing performance of 800 to 1200 mg/g.

11. The hydrogen generating composition according to claim 1, further comprising inorganic electrolyte.

12. A method of generating hydrogen comprising:
(a) providing the hydrogen generating composition of claim 1; and
(b) contacting said hydrogen generating composition with water.

13. The method according to claim 12, wherein said water is supplied to said hydrogen generating composition at a rate of 1.0 to 3.0 ml/h per g of aluminum powder.

14. The method according to claim 12, wherein the reaction yield after 150 minutes is 50% or greater.

15. The method according to claim 12, wherein the alkaline earth metal is calcium oxide, and the aggregation suppressing particles are carbon black.

* * * * *

UNITED STATES PATENT AND TRADEMARK OFFICE
CERTIFICATE OF CORRECTION

| | | |
|---|---|---|
| PATENT NO. | : 7,771,612 B2 | |
| APPLICATION NO. | : 11/661230 | |
| DATED | : August 10, 2010 | |
| INVENTOR(S) | : Taiichi Sugita et al. | |

It is certified that error appears in the above-identified patent and that said Letters Patent is hereby corrected as shown below:

Column 2, line 54; please delete "11.0 g/cm$^3$." and insert --1.0 g/cm$^3$.--, therefor.

Column 5, line 3; please delete "heated," and insert --heated.--, therefor.

Column 8, line 1; please delete "fount" and insert --found--, therefor.

Column 8, line 18, in Claim 1; please delete "μM" and insert --μm--, therefor.

Column 8, line 43, in Claim 8; please delete "μM." and insert --μm.--, therefor.

Signed and Sealed this
Twenty-sixth Day of July, 2011

David J. Kappos
*Director of the United States Patent and Trademark Office*